No. 797,159. PATENTED AUG. 15, 1905.
D. VAN WINKLE, Jr.
LUBRICATOR.
APPLICATION FILED OCT. 25, 1904.
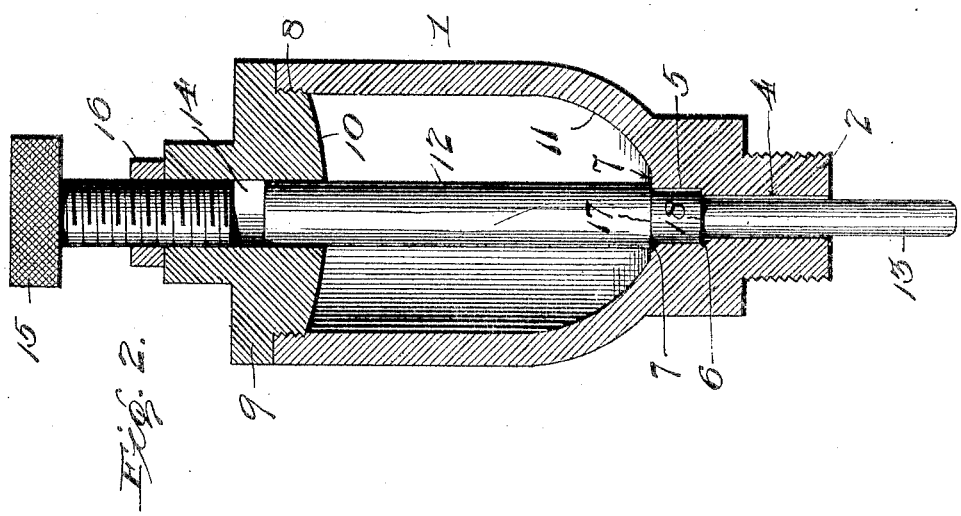
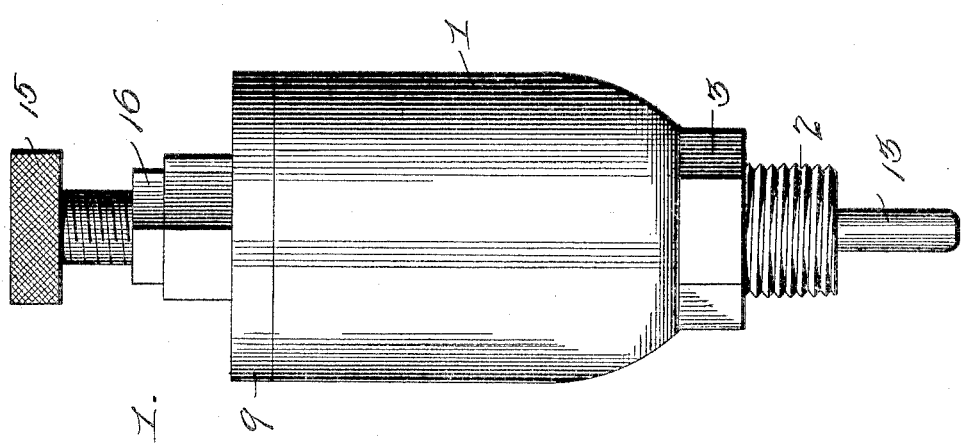
Inventor
DANIEL VANWINKLE, Jr.
Witnesses
By
Attorney

UNITED STATES PATENT OFFICE.

DANIEL VAN WINKLE, JR., OF GALESBURG, ILLINOIS.

LUBRICATOR.

No. 797,159.    Specification of Letters Patent.    Patented Aug. 15, 1905.

Application filed October 25, 1904. Serial No. 229,912.

*To all whom it may concern:*

Be it known that I, DANIEL VAN WINKLE, Jr., a citizen of the United States, residing at Galesburg, in the county of Knox and State of Illinois, have invented certain new and useful Improvements in Lubricators, of which the following is a specification.

This invention relates to lubricators of the type commonly termed "crank-pin oilers," and has for its object to provide certain new and useful improvements in a lubricator of this character whereby the same will be more effective in its use for oiling the crank-pin of an engine.

To this end the invention primarily contemplates a crank-pin oiler designed to be attached to the crank-pin bearing of the engine and provides simple and reliable means for securing the regular delivery of a small quantity of oil to the crank-pin while the engine is in motion and to prevent the discharge or escape of oil when the engine is at rest. In carrying out this object the invention has in view a novel form of feeding-plunger comprising means for effecting a positive force feed at all times and under all conditions during the entire time that any oil or lubricant remains within the oil cup or receptacle. The invention therefore provides a feeding means for positively feeding oil from the oil cup or receptacle until the latter is entirely emptied of its supply. Also the invention provides a form of positive force-feeding plunger which not only insures the forcing of the oil through the outlet-passage, but also provides a double seal for the oil-cup when the engine is at rest, thereby positively preventing the leakage or escape of oil except when the engine is in motion.

Another object of the invention is to provide a force-feed lubricator not only useful in connection as an oiler for crank-pins, but also capable of general application to bearings on moving parts of machinery which would provide for the automatic action of the feeding-plunger.

With these and other objects in view, which will more readily appear as the nature of the invention is better understood, the same consists in the novel construction, combination, and arrangement of parts, which will be hereinafter more fully described, illustrated, and claimed.

The essential features of the invention involved in the construction of the feeding-plunger and the parts coöperating therewith are necessarily susceptible to structural change without departing from the scope of the invention; but a preferred embodiment of the latter is shown in the accompanying drawings, in which—

Figure 1 is a side view of the crank-pin oiler or lubricator embodying the present invention. Fig. 2 is a central longitudinal sectional view thereof.

Like reference-numerals designate corresponding parts in both figures in the drawings.

In carrying out the present invention the receptacle or reservoir containing the oil or lubricator may be conveniently in the form of the conventional oil-cup, (designated by the number 1.) This oil-cup is provided with a closed lower end portion having formed integrally therewith in the usual manner the threaded coupling-neck 2, adapted to be screwed in the socket of the bearing designed to support the lubricator. At the upper end of the threaded neck 2 the closed bottom portion of the cup is preferably formed with an integral polygonal wrench collar or head 3, adapted to be engaged by the wrench or other tool which is employed for attaching or removing the lubricator.

The closed bottom portion of the oil-cup 1, including the wrench-collar of the threaded coupling-neck, is pierced by the outlet-passage 4, through which the oil or lubricant is fed to the bearing. A distinctive feature of the present invention resides in forming said outlet-passage, at the upper end thereof, with an enlarged counterbored portion 5, producing an annular valve-seat 6 within the plane of the passage or bore 4 and disposed a distance below the bottom of the reservoir within the cup 1. In connection with this annular valve-seat 6, provided within the passage or bore 4, the bottom of the reservoir within the oil-cup is formed with a flat annular valve-seat 7, immediately surrounding the orifice at the upper end of the said passage or bore 4, thus forming what may be termed a "plurality" of valve-seats 6 and 7, arranged in stepped order, as may be plainly seen in Fig. 2 of the drawings.

The oil-cup 1 is provided with an open upper end having interior threads 8, engaged by an exteriorly-threaded portion of a flanged cap 9, constituting the top closure for the cup. Said flanged cap 9 is formed with an interior convexed deflector-head 10, constituting the interior crown of the oil-cup 1 and providing an upwardly and outwardly inclined deflecting surface which serves to deflect the oil out to the sides of the oil-cup when thrown to the top of the latter through the motion of the machine element carrying the lubricator. This is important to provide the best feeding conditions, especially with heavy lubricants, and at this point it should be noted that in addition to being provided with a convexed deflector head or crown 10 the oil-cup 1 is formed with a curved downwardly-tapering bottom wall 11, which tapers directly to the outer edge of the flat annular valve-seat 7, surrounding the orifice at the upper end of the outlet-passage 4. Hence while the deflector head or crown 10 keeps the oil out to the wall of the reservoir the downwardly-tapering bottom wall 11 serves to run every particle of oil into the path of the feeding-plunger 12. The feeding-plunger 12 is arranged centrally and longitudinally of the oil-cup and has a reciprocatory feeding motion through the outlet-passage 4. The reduced spindle extremity 13 of the feeding-plunger operates through the outlet-passage 4 and coöperates directly with the crank-pin or other element to be lubricated, to provide for carrying to such element regulated quantities of oil which are forced through the passage or bore 4 through the positive force-feed action of the plunger 12. The opposite end of the plunger within the top part of the oil-cup is guided in its movements within the centrally-arranged guiding-bore 14, provided in the flanged cap 9, and the upper end of said guiding-bore 14 adjustably receives the stem of a regulating-screw 15, which is held fast in its adjusted position through the medium of a jam-nut 16, mounted on the threaded stem of the screw and binding against the upper side of the flanged cap 9. Through the adjustment of the regulating-screw 15 the degree of movement for the plunger 12 is regulated, thus regulating the quantity of oil fed by said plunger through the passage 4. This feeding action of the plunger is accomplished by forming the same with a plurality of annular piston-shoulders 17 and 18, arranged in different transverse planes and in what might be properly termed a "stepped order," to coöperate, respectively, with the separate valve-seats 7 and 6. When the engine is in motion, the feeding-plunger 12 will rise and fall with the motion of the part supporting the lubricator, with the result of causing the shoulders 17 and 18 to have a piston action and force the lubricant or oil through the passage 4. When the engine is at rest, the shoulders 17 and 18 seat themselves firmly on the seats 7 and 6, respectively, thus providing a double cut-off valve or seal for effectively preventing leakage or escape of the oil. To properly provide for the piston action by the shoulders 17 and 18, both the main passage 4 and the counterbored portion 5 are of greater diameter than the portions of the plunger operating therein.

From the foregoing it is thought that the construction, operation, and many advantages of the herein-described lubricator will be readily apparent without further description, and it will be understood that various changes in the form, proportion, and minor details of construction may be resorted to without departing from the scope of the invention or sacrificing any of the advantages thereof.

Having thus described the invention, what is claimed, and desired to be secured by Letters Patent, is—

In a lubricator of the class described, an oil-cup provided at the bottom with an outlet-passage having an enlarged counterbored portion producing within the plane thereof an annular valve-seat, said cup being also provided at the bottom of its reservoir with a flat annular valve-seat immediately surrounding the orifice at the inner end of said outlet-passage, and a reciprocatory force-feed plunger operating through the outlet-passage and provided with a stepped arrangement of separate annular piston-shoulders coöperating respectively with the said separate valve-seats said outlet-passage and the enlarged counterbored portion thereof being of greater diameter than the portions of the plunger operating therein.

In testimony whereof I affix my signature in presence of two witnesses.

DANIEL VAN WINKLE, Jr.

Witnesses:
  W. J. SULLIVAN, Jr.,
  W. F. DENNY.